Jan. 20, 1925.  1,523,502
N. H. ANDERSON
WEIGHING SCALE
Filed Sept. 10, 1921  2 Sheets-Sheet 1

INVENTOR
Nils H. Anderson
BY
Duell, Warfield & Duell
ATTORNEY

Jan. 20. 1925.
H. ANDERSON
WEIGHING SCALE
Filed Sept. 10, 1921    2 Sheets-Sheet 2
1,523,502
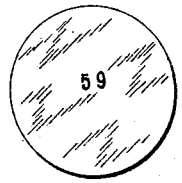
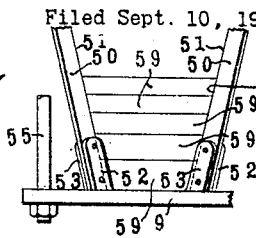
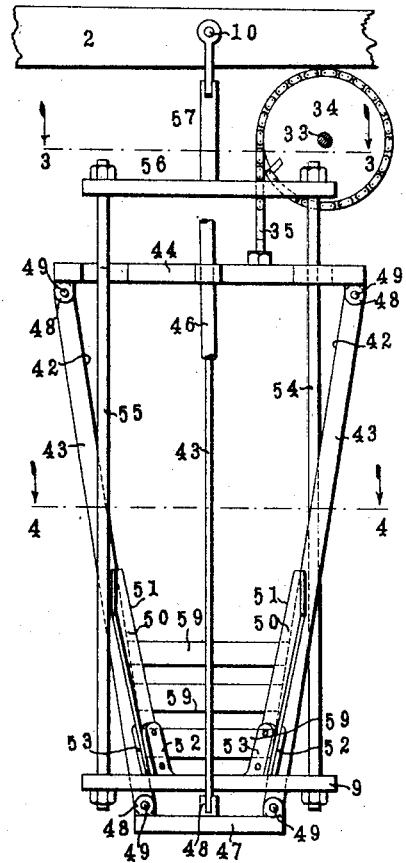
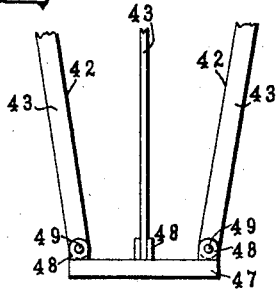
INVENTOR
Nils N. Anderson
BY
Duell Warfield Duell
ATTORNEY Patented Jan. 20, 1925.

1,523,502

UNITED STATES PATENT OFFICE.

NILS H. ANDERSON, OF BRIDGEPORT, CONNECTICUT, ASSIGNOR TO E. AND T. FAIRBANKS AND COMPANY, OF ST. JOHNSBURY, VERMONT, A CORPORATION OF VERMONT.

WEIGHING SCALE.

Application filed September 10, 1921. Serial No. 499,724.

*To all whom it may concern:*

Be it known that I, NILS H. ANDERSON, a citizen of the United States, residing at Bridgeport, in the county of Fairfield and State of Connecticut, have invented certain new and useful Improvements in Weighing Scales, of which the following is a full, clear, and exact description, such as will enable other skilled in the art to which it appertains to make and use the same.

This invention relates to weighing scales and with respect to its more specific features to scales in which the weight of the load is automatically indicated on a dial.

One of the objects of the invention is the provision of a mechanism adapted to be utilized to transfer total capacity weights to and from the weight receiver of the weigh beam and to eliminate many of the possibilities whereby efficient actuation of the weights might become impaired.

Another object of the invention is the provision of an efficient device of the character referred to adapted to operate with weights having no fingers.

Another object of the invention is the provision of a device of the character referred to adapted to efficiently actuate weights even though they become rotatably displaced while in the cage or on the weight receiver.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views.

Fig. 2 is a side elevation of a portion of a weigh beam with the weight carrier and associated receiver;

Fig. 3 is a horizontal section through Fig. 2 on the line 3—3;

Fig. 4 is a horizontal section through Fig. 2 on the line 4—4;

Fig. 5 is a side elevation of a portion of the weight carrier or cage;

Fig. 6 is a side elevation of a portion of the weight receiver;

Fig. 7 is a plan view of one of the weights; and

Fig. 8 illustrates some of the weights as they lie in the weight receiver.

Figure 1:
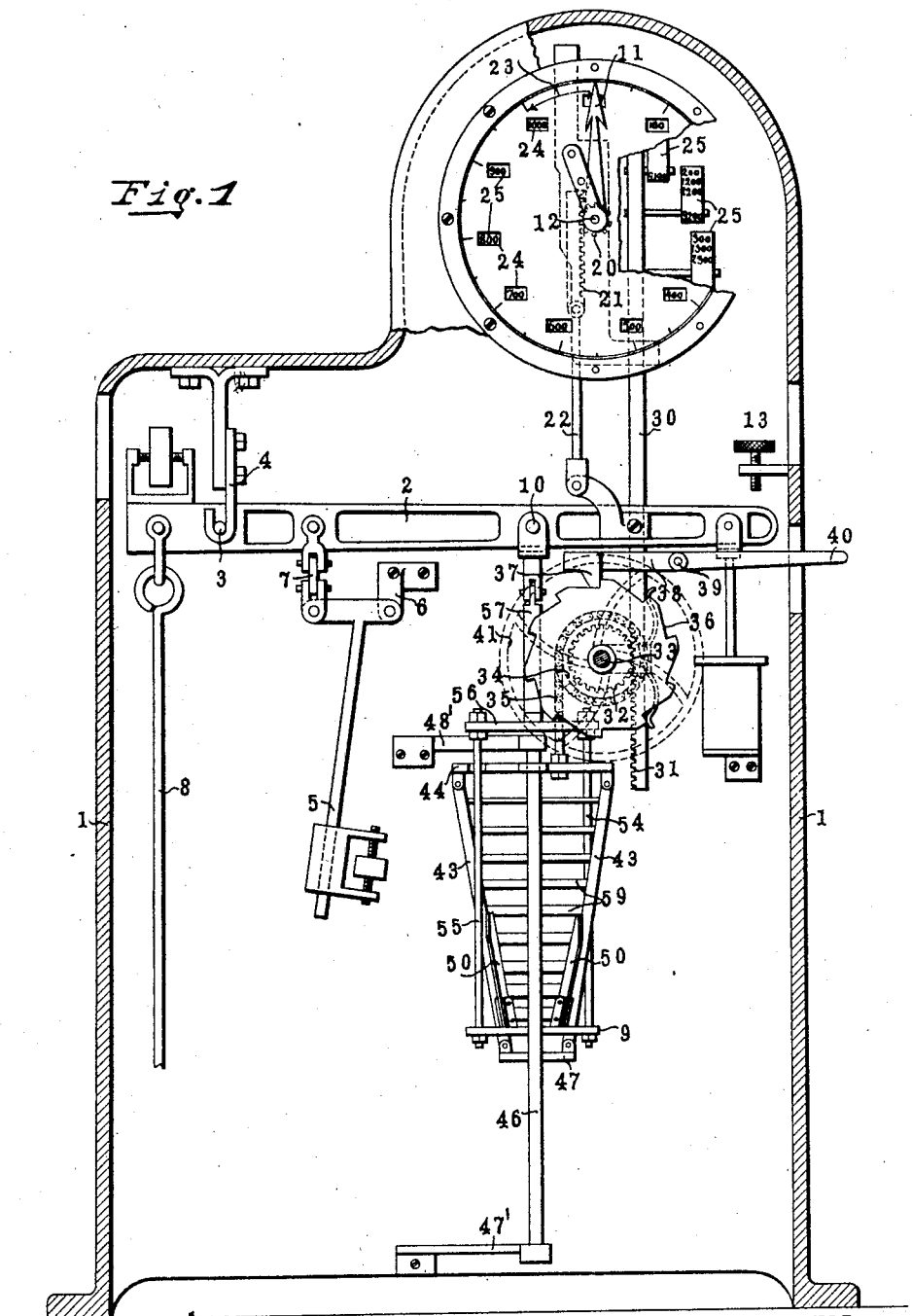
Figure 1 is a sectional elevation of a scale equipped with the invention, the front of the casing being removed for clearer disclosure of parts.

Referring now more specifically to the drawings and more particularly to Fig. 1 thereof, the numeral 1 indicates the scale casing or frame. The weigh beam is indicated at 2, being fulcrumed or pivoted to the frame at 3 by means of a bracket 4. The numeral 5 indicates a pendulum, in the present instance pivoted to a bracket 6 supported by the frame 1 and having link connections 7 with the beam 2, the province of the pendulum being to counter-balance a load up to the capacity of the dial. The numeral 8 indicates a load supporting rod which extends downwardly from the beam 2 and is to be connected to the platform levers of the scale. The numeral 9 indicates a weight supporting plate of the weight receiver, the weight receiver being pivotally connected to the beam 2 at 10, this receiver being hereinafter more specifically described. The numeral 11 indicates the dial pointer, being in the present instance a hand carried by a short rotary shaft 12, the axis of which is within the graduated circumference of the dial. The shaft 12 is supported from the frame 1 in suitable manner. The dial pointer 11 is operatively connected to the beam 2 and travels over the graduations of the dial in either of opposite directions in response to movements of the beam. Upward movement of the beam may be limited by a stop 13. The shaft 12 is provided with a pinion 20 and a rack 21 on a rod 22 communicates movement to the pointer 11 from the beam. As the beam rises and falls the pointer 11 travels in one direction or the other and indicates on the dial the weight of a load.

In the present embodiment the front face of the dial is graduated for a full circumference of the circular line lacking only the small arc indicated by the numeral 23. Opposite the main graduations are windows 24 in the dial. In rear of the dial are a series of number carriers, or plates 25, each plate being provided with a series of numbers which singly appear at the adjacent windows so as to number the main graduations of the dial. In one position of the number plates the windows will be numbered from zero to one thousand in intervals of hundreds as illustrated in Fig. 1. Between the windows the graduations on the dial are read in conjunction with the window reading to ascertain intermediate weights. By raising the number plates 25 to bring the next figures thereon opposite the windows, the main graduations will be numbered from one thousand to two thousand, and so on. The special dial and number plate herein disclosed, together with the connections for operating the number plates from the operating shaft 33 to which the weight carrier is connected are illustrative as exemplifying a dial structure which may be employed in connection with the capacity weight transfer mechanism herein disclosed. Reference is made to the application of Alan E. Ashcraft filed March 16, 1921, Serial No. 452,710 for a full disclosure of the dial structure and the connections therefrom to the shaft 33. It may be noted herein, however, that the number plates 25 are raised and lowered through the instrumentality of the vertical rod 30 having rack teeth 31 cooperating with the teeth of a pinion 32 rotatable with the carrier operating shaft 33 supported by the frame 1. Rotatable with the shaft 33 is a pulley or drum 34. The numeral 35 indicates a flexible suspending device, or chain, one end of which is fastened to the pulley 34 and the other to the weight cage, or weight carrier, hereinafter more fully described. Also rotatable with the shaft 33 is a ratchet wheel 36 with which cooperates the tooth 37 of a ratchet, or dog 38, pivotally supported from the frame at 39 and having a hand piece 40 projecting outside the casing for convenient manipulation.

In the present embodiment the weight cage, or weight carrier moves downwardly under its own weight, when the tooth 37 is disengaged from the ratchet wheel 36. It may be moved upwardly by rotation of the shaft 33 in the proper direction, as by the rotation of the hand wheel 41 on shaft 33 in convenient position outside the casing, and shown in dotted lines in Fig. 1. The weight carrier is provided with weight supporting surfaces 42 at different points around the longitudinal, vertical, axis thereof, these surfaces inclining downwardly toward said longitudinal axis. As shown the surfaces 42 are the inner faces of a plurality of longitudinal bars, or weight supporting members 43, said bars converging in a downward direction toward the axis of movement of the carrier. As will be seen the bars 43 may also serve as weight guides. At 44 is indicated a transversely disposed top member of the carrier in the present embodiment a generally circular plate, to the lower face of which the bars 43 are fastened at the points 45, 90° apart. The path of movement of the carrier may be regulated by vertical guide rods 46, respectively fastened to brackets 47' and 48' carried by the frame 1, one of these rods being shown in Fig. 1. The chain 35 may be connected to the plate 44 in any efficient manner. The angle of convergence, or inclination to the axis, of the weight supporting rods 43 is maintained by means of a transversely disposed bottom plate 47 connecting the bars 43. The connections between the bars 43 and the plates 44 and 47 may be by means of pairs of lugs 48 between which the ends of the bars are seated and held by means of pins 49. In this wise either or both plates 44 and 47 may be removed and replaced by others so as to provide for a different angle of inclination of the bars 43 when desired.

The weight receiver, or holder, receives the weights from the weight carrier so as to cause them to oppose the weight of the load on the scale. The weight receiver vibrates with the weigh beam 2 and, longitudinally, or vertically, is substantially co-axial with the weight cage. It may include the transversely disposed weight supporting plate 9, previously referred to, which provides a surface for the reception of the bottom of lowermost weight. The numerals 50 indicate a plurality of generally longitudinally extending studs disposed at different points around the longitudinal axis of the weight receiver, the inner edges, or surfaces 51 of the studs converging downwardly toward said axis. When the weights have been transferred to the receiver they lie between the studs 50 and at that time lateral movement of the weights relative to the receiver is restrained by the studs. In the present embodiment the angle of inclination or convergence of the edges 51 of the studs is such that the weights transferred from the weight cage rest one on the other in the receiver, the lowermost weight resting upon the transverse plate 9. Should any weight on the carrier be laterally displaced relative thereto or assume a slightly tilted position, the studs 50 will serve to guide such weight to horizontal position in the receiver co-axial with other weights therein.

As illustrated, the studs 50 are connected to the supporting plate 9 through the instrumentality of pairs of lugs 52 and 53 on the plate 9 between which the lower ends of the studs 50 are held. The studs 50 of the receiver are in planes around the longitudinal axis of movement alternating with those of the bars 43 of the carrier and the plate 47 connects the bars 43 below the weight supporting plate 9. The numerals 54 and 55 indicate receiver supporting rods which extend from the supporting plate 9 past the top member 44 to points above the latter, where they are connected by a cross piece 56 upstanding from which is a centrally disposed stem 57 which is operatively connected to the weigh beam 2 at the point 10.

In the present embodiment the weights 59, are round so as to nicely fit between the inner edges of the bars 43 and to be supported by the plate 9 between the studs 50. The diameters of the weights are different, upper weights being of greater diameter than lower weights, the diameters of the weights relative to each other being such that they will be supported by the bars 43 in superposed relation in different horizontal planes. As illustrated the inner surfaces, or edges 42 of the bars 43 are rectilinear in a downward direction. To comport with the inclination of these surfaces the lateral surfaces of the weights taper downwardly as indicated at 60 and may be conical surfaces. It is to be understood, however, that weights of other shapes may be employed.

The operation may be briefly described as follows:—The weight receiver will be equipped with a plurality of weights 59, nine weights being employed in the present embodiment, each weight being such as to counter-balance one thousand pounds on the dial. By manipulating the hand wheel 41 the weight cage, or carrier, will be raised to its uppermost position in which all the weights will be supported by their lateral faces resting on the inclined surfaces of the bars 43, the weights taking position on the carrier vertically spaced from each other the upward extent of the bars 43 being sufficient to support the weights simultaneously. With the carrier in its uppermost position the first number on each carrier plate 25 will appear at the adjacent window in the dial, so that the windows will be numbered from zero to one thousand in intervals of hundreds, when read clockwise. When a load is placed upon the platform of the scale equal to or less than one thousand pounds, the pointer 11 will turn to the proper graduation on the dial and the weight of the load will be indicated thereby. Should the load exceed one thousand pounds the pointer will pass the window presenting the numeral one thousand and this will indicate to the operator of the scale that the load is in excess of the dial reading at that time. Thereupon the operator depresses the handle 40 of the dog 38 thereby disengaging the tooth 37 from the ratchet wheel 36. This permits the weight cage to descend under the influence of gravity. Descent of the weight cage may be controlled by a suitable dash-pot (not illustrated). As the weight carrier descends, first the lowermost weight will be transferred to the receiver. In the present embodiment the bottom of the lowermost weight will rest on the plate 9 between the studs or guides 50, these latter serving to restrain lateral movement of the weight on the receiver and to guide it to central position between the studs. Upper weights will in turn be deposited on the lowermost weight by further descent of the weight carrier so that eventually sufficient weight will have been deposited upon the receiver to overcome the weight of the load; move the scale beam 2 downwardly, and cause the pointer to move anti-clockwise over the dial and assume position in accordance with the weight of the load. The descent of the weight carrier results in lifting the number carriers 25, and for each weight deposited on the weight receiver new numbers will appear at the several windows, thus increasing the dial reading in accordance with the weight value deposited. In practice, when the pointer 11 makes its anti-clockwise movement the handle of the dog 38 is released, whereupon the ratchet wheel 36 is re-engaged by the tooth 37 and the descent of the weight cage arrested. The weight of the load will then be indicated by the numeral appearing at the window directly opposite the pointer, if the pointer registers with the window graduation. If the pointer assumes position between the windows the weight will be indicated by the lesser figure at the window next adjacent the pointer plus the indication of the graduation with which the pointer registers.

By then turning the hand wheel 41 the weight cage will be raised and first the upper weight in the receiver and then in succession the lower weights will be picked up by the bars 43 and re-transferred to the weight cage so that when the cage has reached its uppermost position all the weights will rest thereon in position for another weighing operation. It will be observed that the weights are quite simple in construction being, in the present embodiment, mere plates with tapering lateral surfaces. Therefore the expense of manufacturing the weights and of giving them predetermined weight value is minimized. Even though the weights should rotate relative to the receiver or the weight cage the construction herein described provides for their transfer to efficient operative position on the receiver and re-transfer in like manner to the weight cage.

Thus by the above described construction are provided among others the objects hereinbefore referred.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a weighing scale, in combination, a vertically movable weight-receiver and an upwardly and downwardy movable weight-carrier adapted to co-operate to effect transfer of weights from said carrier to said receiver on downward movement of said carrier and from said receiver to said carrier on upward movement of said carrier, and a plurality of superposed weights of different diameters co-operatively associated with said carrier and said receiver, said receiver and said carrier including weight guides alternating with each other around the axis of movement.

2. In a weighing scale, in combination, a vertically movable weight-receiver and an upwardly and downwardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly.

3. In a weighing scale, in combination, a vertically movable weight-receiver and an upwardly and downwardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly, said members being in planes alternating with those of said guides around the axis of movement.

4. In a weighing scale, in combination, a vertically movable weight-receiver, an upwardly and downwardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly, and a plurality of superposed weights of different diameters co-operatively associated with said carrier and said receiver.

5. In a weighing scale, in combination, a vertically movable weight-receiver, an upwardly and downwardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly, and a plurality of superposed weights of different diameters co-operatively associated with said carrier and said receiver, the diameters of upper weights being greater than those of lower weights.

6. In a weighing scale, in combination, a vertically movable weight-receiver, an upwardly and downardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly, and a plurality of superposed weights of different diameters co-operatively associated with said carrier and said receiver the diameters of upper weights being greater than those of lower weights, the lateral surfaces of said weights tapering downwardly.

7. In a weighing scale, in combination, a vertically movable weight-receiver, an upwardly and downwardly movable weight-carrier adapted to co-operate to effect transfer of weights from said carrier to said receiver on downward movement of said carrier and from said receiver to said carrier on upward movement of said carrier, said carrier including weight supporting members converging downwardly and said receiver including weight guides converging downwardly, and a surface for reception of the bottom of the lowermost weight.

8. In a weighing scale, in combination, a weight cage, including a plurality of longitudinal bars providing weight supporting surfaces at different points around and inclining downwardly toward the longitudinal axis of the cage, and a weight receiver longitudinally substantially coaxial with said cage including a plurality of longitudinal studs at different points around and inclining downwardly toward said axis for reception therebetween of weights from said cage.

9. In a weighing scale, in combination, a weight cage, including a plurality of longitudinal bars providing weight supporting surfaces at different points around and inclining downwardly toward the longitudinal axis of the cage, a weight-receiver longitudinally substantially coaxial with said cage including a plurality of longitudinal studs at different points around and inclining downwardly toward said axis for reception therebetween of weights from said cage, and a transversely disposed weight supporting plate.

10. In a weighing scale, in combination, a weight cage, including a plurality of longitudinal bars providing weight supporting surfaces at different points around and inclining downwardly toward the longitudinal axis of the cage, and a weight receiver longitudinally substantially coaxial with said cage including a plurality of longitudinal studs at different points around and inclining downwardly toward said axis for reception therebetween of weights from said cage, said bars being in planes alternating with said studs around said axis.

11. In a weighing scale, in combination, a weight cage, including a plurality of longitudinal bars providing weight supporting surfaces at different points around and inclining downwardly toward the longitudinal axis of the cage, a weight receiver longitudinally substantially coaxial with said cage including a plurality of longitudinal studs at different points around and inclining downwardly toward said axis for reception therebetween of weights from said cage, said bars being in planes alternating with said studs around said axis, and a transversely disposed weight supporting plate to which said studs are connected.

12. In a weighing scale, in combination, a weight cage, including a plurality of longitudinal bars providing weight supporting surfaces at different points around and inclining downwardly toward the longitudinal axis of the cage, a weight receiver longitudinally substantially coaxial with said cage including a plurality of longitudinal studs at different points around and inclining downwardly toward said axis for reception therebetween of weights from said cage, said bars being in planes alternating with said studs around said axis, a transversely disposed weight supporting plate to which said studs are connected, a transversely disposed top member for said cage, and receiver supporting rods extending from said weight supporting plate past said top member to points above the latter.

13. In a weighing scale, in combination, a weight cage, including a plurality of longitudinal bars providing weight supporting surfaces at different points around and inclining downwardly toward the longitudinal axis of the cage, a weight receiver longitudinally substantially coaxial with said cage including a plurality of longitudinal studs at different points around and inclining downwardly toward said axis for reception therebetween of weights from said cage, said bars being in planes alternating with said studs around said axis, a transversely disposed weight supporting plate to which said studs are connected, a transversely disposed top member for said cage, receiver supporting rods extending from said weight supporting plate past said top member to points above the latter and a transversely disposed bottom member connecting said bars below said weight supporting plate.

In testimony whereof I affix my signature, in the presence of two witnesses.

NILS H. ANDERSON.

Witnesses:
B. B. JOYCE,
P. B. CARLSON.